(No Model.)
J. A. BALDWIN, Jr.
PIPE AND OTHER JOINTS.
No. 294,562. Patented Mar. 4, 1884.
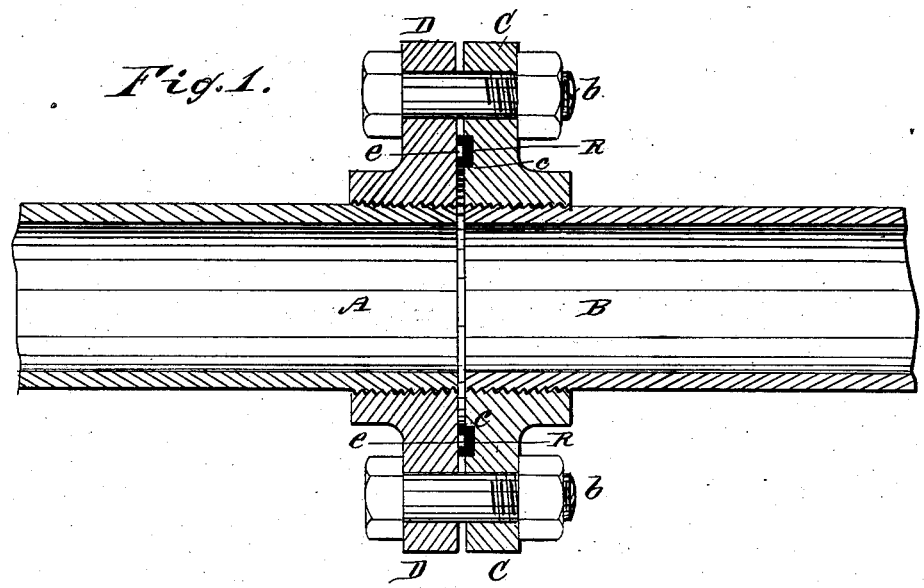
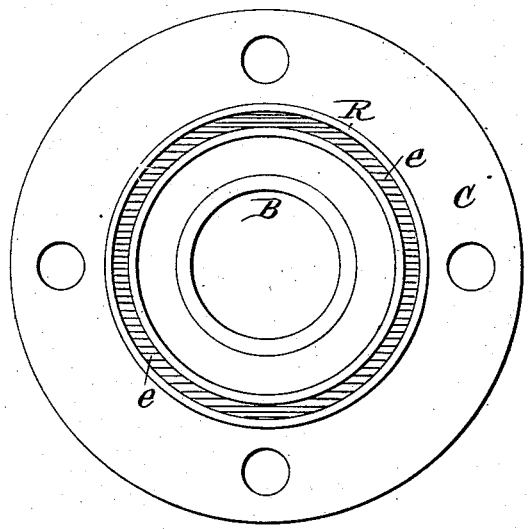
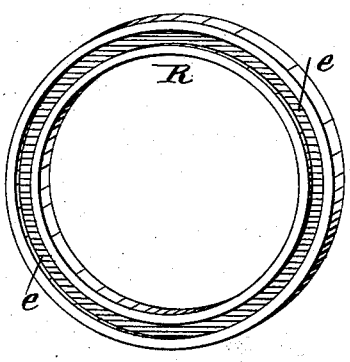
WITNESSES:
INVENTOR:
J. A. Baldwin Jr.
BY Munn & Co
ATTORNEYS.

UNITED STATES PATENT OFFICE.

JAMES A. BALDWIN, JR., OF EAST JAFFREY, NEW HAMPSHIRE.

PIPE AND OTHER JOINTS.

SPECIFICATION forming part of Letters Patent No. 294,562, dated March 4, 1884.

Application filed September 14, 1883. (No model.)

*To all whom it may concern:*

Be it known that I, JAMES A. BALDWIN, Jr., of East Jaffrey, in the county of Cheshire and State of New Hampshire, have invented a new and useful Improvement in Pipe and other Joints, of which the following is a full, clear, and exact description.

This invention relates to joints for pipes and other ducts or vessels used for the transmission or retention of steam and other vapors, gases, water, and other fluids. Although not restricted to such connecting parts, it is more particularly designed for the flange-joints of pipes; and it consists in a copper ring, having in its projecting face an annular groove, and inserted for a portion of its thickness in the face of one of the flanges or parts to be joined, for the face of the other flange or part to bear against when the two flanges or parts are drawn or forced toward each other, or the one flange or part toward the other, substantially as hereinafter more fully set forth and claimed.

Reference is to be had to the accompanying drawings, forming part of this specification, in which similar letters of reference indicate corresponding parts in all the figures.

Figure 1 represents a longitudinal section of two connected pipes, in part, joined together by screw-threaded flanges, bolted together, and having the copper ring applied to the faces of the joint. Fig. 2 is a face view of one of the flanges fitted on the end of one of the pipes, and with the partly-embedded copper ring in the face of said flange; and Fig. 3 is a perspective view of the copper ring detached.

A B indicate the two pipes to be connected, and C D the flanges by which they are joined together, said flanges having internal screw-threads which fit corresponding threads on the meeting ends of the pipes, and being secured together by bolts *b b*.

R is the copper ring, which is inserted in an annular groove, *c*, in the face of the one flange, C, said groove being of less depth than the thickness of the ring, so that the ring will have a facial projection from the flange which carries it, whereby when the two flanges or pipes are drawn toward each other in tightening up the joint the partially-countersunk copper ring will form a close-fitting packing between the flanges. I construct the ring R with one or more annular grooves, *e*, in its outer face, whereby a series of concentric ridges will be formed on the ring, to give increased efficiency to the packing. By the insertion of the ring R within a groove in the one flange it is restrained from slipping out of place, and is held in its proper position when closing the joint.

A pipe or other like joint-packing thus constructed will resist a great pressure and make the joint equal or superior to a ground one. The joint can be as readily taken apart and put together as a ground one, and it will always prove tight and free from leakage, while its expense will be little, if any, greater than an ordinary putty joint.

I am aware that it is old to provide a packing made of copper wire, with its base—that edge which fits into the groove—concaved to allow the spreading of the metal as the same is hammered, to firmly and permanently secure or wedge it in the groove.

Having thus fully described my invention, I claim as new and desire to secure by Letters Patent—

1. The packing-ring having a plain surface on one side, and an annular groove in its opposite side, substantially as and for the purpose set forth.

2. The packing consisting of the ring with a plain surface on one side, and an annular groove in its opposite side, the plain-surfaced side of said ring being inserted into a groove of one part of the joint, and the projecting grooved side of said ring bearing against the face of the opposite part of said joint, substantially as and for the purpose set forth.

3. In pipe-joints, the combination of the internally-screw-threaded flanges C D, the bolts *b*, uniting said flanges, the externally-screw-threaded pipes A B, and the copper ring R, having in its projecting face an annular groove, *e*, and partially countersunk within the face of the one of said flanges, substantially as specified.

JAMES A. BALDWIN, JR.

Witnesses:
JOSEPH WHITE,
F. S. PIERCE.